United States Patent
Maddocks et al.

(10) Patent No.: US 9,615,682 B1
(45) Date of Patent: Apr. 11, 2017

(54) HEADREST FOR HEAD AND NECK

(71) Applicant: GAS Brand Starter, LLC, Boulder, CO (US)

(72) Inventors: Glenn Maddocks, Boulder, CO (US); Sean O'Meara, La Mesa, CA (US)

(73) Assignee: BullRest LLC, Boulder, CO (US)

( * ) Notice: Subject to any disclaimer, the term of this patent is extended or adjusted under 35 U.S.C. 154(b) by 0 days.

(21) Appl. No.: 15/164,474

(22) Filed: May 25, 2016

Related U.S. Application Data

(63) Continuation of application No. 15/068,385, filed on Mar. 11, 2016.

(Continued)

(51) Int. Cl.
| | | |
|---|---|---|
| A47G 9/10 | (2006.01) | |
| A47C 7/38 | (2006.01) | |
| B60N 2/48 | (2006.01) | |
| B60N 2/56 | (2006.01) | |
| A61G 7/10 | (2006.01) | |

(52) U.S. Cl.
CPC ............ *A47G 9/1081* (2013.01); *A47C 7/383* (2013.01); *A61G 7/1084* (2013.01); *B60N 2/48* (2013.01); *B60N 2/5664* (2013.01)

(58) Field of Classification Search
CPC .......... A61F 5/3707; A61F 5/055; A47C 7/36; A47C 7/38; A47C 7/383; A47C 1/036; A47G 9/10; A47G 9/1054; A47G 9/1081; A47G 2009/1018; A47G 7/1084; A61G 13/121; A61G 13/1215; B60N 2/48; B60N 2/5664
See application file for complete search history.

(56) References Cited

U.S. PATENT DOCUMENTS

| | | | |
|---|---|---|---|
| 4,285,081 A | * | 8/1981 | Price ............... A47C 7/383 297/391 |
| 4,345,347 A | | 8/1982 | Kantor |

(Continued)

FOREIGN PATENT DOCUMENTS

| | | |
|---|---|---|
| CA | 2600812 | 9/2006 |
| GB | 2510644 | 8/2014 |

(Continued)

OTHER PUBLICATIONS

Cabeau—Evolution Cool. https://www.cabeau.com/products/evolution-cool/.

(Continued)

*Primary Examiner* — David E Sosnowski
*Assistant Examiner* — David R Hare
(74) *Attorney, Agent, or Firm* — Rocky Mountain Patent, LLC

(57) ABSTRACT

Certain embodiments of the present disclosure are related to a supportive apparatus for the head and neck. Embodiments of the invention incorporate a C-shaped apparatus shaped to support the posterior region of the neck. A center region found in certain embodiments of the C-shaped apparatus is placed on the posterior of a neck. Lateral supports found in certain embodiments of the C-shaped apparatus are placed on the lateral aspect of a neck. Embodiments of the invention include an opening across a center region functioning to support the apparatus, and to further act as to ventilate a user's nape.

18 Claims, 5 Drawing Sheets

Related U.S. Application Data

(60) Provisional application No. 62/300,406, filed on Feb. 26, 2016.

(56) References Cited

U.S. PATENT DOCUMENTS

| | | | | |
|---|---|---|---|---|
| 4,504,050 A * | 3/1985 | Osborne | | A61G 13/12 378/179 |
| 4,562,833 A * | 1/1986 | Pujals, Jr. | | A61F 5/055 128/DIG. 23 |
| 4,565,408 A * | 1/1986 | Palley | | A47C 7/383 297/392 |
| 4,708,129 A * | 11/1987 | Pujals, Jr. | | A61F 5/055 128/DIG. 23 |
| 5,005,564 A * | 4/1991 | Grundei | | A61F 5/055 128/DIG. 15 |
| 5,154,649 A | 10/1992 | Pender | | |
| 5,230,698 A * | 7/1993 | Garth | | A61F 5/055 128/DIG. 23 |
| 5,334,133 A * | 8/1994 | Carroll | | A61F 5/055 128/870 |
| D396,594 S | 8/1998 | Lefebvre | | |
| 5,974,607 A | 11/1999 | Smith | | |
| D420,845 S | 2/2000 | Rumage | | |
| 6,230,348 B1 | 5/2001 | Patrikakis | | |
| 6,230,349 B1 | 5/2001 | Silver | | |
| D445,624 S | 7/2001 | Futagami | | |
| 6,305,749 B1 * | 10/2001 | O'Connor | | A47C 7/383 297/397 |
| D503,062 S | 3/2005 | Nash | | |
| D522,300 S | 6/2006 | Roberts | | |
| 7,287,528 B2 * | 10/2007 | Ho | | A61M 16/06 128/206.21 |
| 7,371,221 B1 * | 5/2008 | Baker | | A61F 5/055 602/18 |
| D613,987 S | 4/2010 | Heeter | | |
| D619,402 S | 7/2010 | Sternlight | | |
| 7,788,751 B1 * | 9/2010 | Diemer | | A47C 16/00 297/391 |
| D624,777 S | 10/2010 | Pepys | | |
| 7,926,133 B2 * | 4/2011 | Xiao | | A47G 9/1045 5/636 |
| D637,439 S | 5/2011 | Mettler | | |
| 8,144,913 B1 | 3/2012 | Myles | | |
| 8,205,283 B1 * | 6/2012 | Russell | | B60N 2/4879 5/630 |
| D664,799 S | 8/2012 | Schwingendorf | | |
| 8,418,293 B2 | 4/2013 | Tansingco | | |
| 8,566,986 B1 * | 10/2013 | Chu | | A47G 9/1045 5/636 |
| 8,584,285 B1 * | 11/2013 | Sipherd | | A47C 7/383 5/636 |
| 8,646,135 B2 | 2/2014 | Shamaiengar | | |
| D701,063 S | 3/2014 | Myers | | |
| D704,963 S | 5/2014 | McNeil | | |
| 8,806,679 B2 * | 8/2014 | Soto | | A61G 13/101 5/507.1 |
| 8,858,481 B2 * | 10/2014 | Thorgilsdottir | | A61F 5/055 128/DIG. 23 |
| 8,898,840 B1 * | 12/2014 | Majette | | A47C 7/383 297/393 |
| 9,021,636 B2 | 5/2015 | Schwingendorf | | |
| 9,072,647 B2 * | 7/2015 | Porter | | A61G 99/00 |
| 9,113,732 B2 | 8/2015 | Loth | | |
| D739,668 S | 9/2015 | Owens | | |
| 9,155,409 B2 | 10/2015 | Cohen | | |
| D746,080 S | 12/2015 | Mittelstadt | | |
| D753,415 S | 4/2016 | Atawane | | |
| 2002/0156408 A1 * | 10/2002 | Cheatham | | A61F 5/055 602/13 |
| 2003/0135927 A1 | 7/2003 | Hsia | | |
| 2004/0084053 A1 * | 5/2004 | Hess | | A61F 5/3707 128/870 |
| 2005/0264055 A1 | 12/2005 | Lincoln | | |
| 2008/0229498 A1 * | 9/2008 | Grosso | | A47C 7/383 5/244 |
| 2009/0013471 A1 | 1/2009 | Yang | | |
| 2009/0307846 A1 | 12/2009 | Eura | | |
| 2013/0253395 A1 * | 9/2013 | Sandhu | | A61F 7/106 602/14 |
| 2014/0026323 A1 * | 1/2014 | Bowers | | A47G 9/10 5/636 |
| 2014/0130261 A1 | 5/2014 | Gumbrecht | | |
| 2014/0144450 A1 * | 5/2014 | Aarestad | | A61F 5/56 128/845 |
| 2015/0082546 A1 | 3/2015 | Sternlight | | |
| 2015/0190266 A1 | 7/2015 | Hollern | | |
| 2015/0216335 A1 | 8/2015 | Schwingendorf | | |
| 2015/0257555 A1 * | 9/2015 | Wong | | A47C 7/383 5/636 |
| 2015/0257556 A1 | 9/2015 | Morin | | |
| 2015/0274044 A1 | 10/2015 | Kreppein | | |
| 2015/0314715 A1 | 11/2015 | Kilgore | | |

FOREIGN PATENT DOCUMENTS

| | | |
|---|---|---|
| KR | 10-1538695 | 7/2015 |
| WO | 2014105036 A1 | 7/2014 |
| WO | 2016003372 A1 | 1/2016 |

OTHER PUBLICATIONS

Travel Pillow Neck Pillow Body Pillow Versatile Neck and Body. http://www.dhgate.com/store/product/travel-pillow-neck-pillow-body-pillow-total/121391551.html.
Memory Foam Neck Pillow. https://www.necksofausa.com/blog/tag/memory-foam-neck-pillow/.
Bureau of Transportation Statistics. http://www.transtats.bts.gov/.
Car Seat Headrest. http://www.banggood.com/Car-Seat-Headrest-Memory-Foam-Cotton-Neck-Support-Rest-Cushion-Travel-Pillow-p-1033223.html.
First Notice of Allowance for U.S. Appl. No. 29/537,124, Office Communication Jun. 13, 2016.
Second Notice of Allowance for CPA U.S. Appl. No. 29/537,124, Office Communication, Sep. 23, 2016.

* cited by examiner

HEADREST FOR HEAD AND NECK

CROSS REFERENCE TO RELATED APPLICATIONS

This application is a continuation of U.S. patent application Ser. No. 15/068,385, entitled "Headrest for Head and Neck" filed Mar. 11, 2016 currently pending. U.S. patent application Ser. No. 15/068,385 claims benefit to provisional patent application No. 62/300,406, entitled "Headrest for Head and Neck", filed Feb. 26, 2016, the contents of each of which are incorporated by reference in their entirety for all purposes.

FIELD OF THE INVENTION

Embodiments of the present disclosure are related to headrests for the head and neck, and improvements thereof.

BACKGROUND OF THE INVENTION

There are over 300 million business travelers worldwide who fly several times a year. According to the United States Department of Transportation, since 2010, there are over 600 billion domestic airline passengers every year, and over 150 billion international airline passengers every year (Bureau of Transportation Statistics T-100 Market data, Passengers www.transtats.bts.gov/ 17 Feb. 2016). Traveling can take up a large portion of a person's day. Travelers may choose to rest or sleep during traveling, but seating in commercial vehicles may not allow for restful sleep or comfort. Seats found in a vehicle, such as an airplane, automobile, bus, or train, can be uncomfortable for a passenger, as vehicle seats offer limited support for a user's head and neck.

SUMMARY OF THE INVENTION

Traditional pillows are often cumbersome during travel (e.g. during commercial airline travel, traditional pillows may be too large to fit in a carry-on luggage compromising space for other luggage). Existing travel pillows are often bulky, taking up much of a traveler's limited carry-on luggage space or size allowance. With limitations imposed on the size or number of items a person may carry, a traveler may have to make a decision whether or not to sacrifice personal comfort, because a bulky travel pillow occupies too much of the limited size allowance. Certain travel pillows are volumetrically inefficient and occupies too much of the limited space in a luggage-piece.

Existing travel pillows are supposed to support the head and neck. However, many of the existing travel pillows do not properly fit within a head and neck region and do not provide support because of the improper fit. Improper fit leads to lacking full support of the neck. In certain cases, travel pillows may shift while a user is sleeping. The shift results in a travel pillow in an incorrect position, causing strain to a user's neck.

Furthermore, existing travel pillows also fail to support the lateral alignment of the neck because they fail to provide adequate structural support. Most pillows have beaded inners, or foam that compress during use, thus failing to provide the structural rigidity needed to keep the upper neck vertebrae (C1-C17) aligned.

Other existing travel pillows are inflatable. Inflatable travel pillows, however, are uncomfortable, as they are constructed of unbreathable material and fail to provide consistent support, comfort of use, breathability and consistent support. Because inflatable travel pillows require an air-tight bladder, they cause discomfort due to a lack of ventilation that non-deflatable solutions may provide. Furthermore, the air-tight bladder may be punctured, creating an inconsistent and uncomfortable use if deflated.

Accordingly, certain embodiments of the present invention relate to a supporting apparatus for the neck, head, and shoulders, providing consistent and comfortable support. Certain embodiments of the invention comprise a C-shaped form, intended to interface with a user's shoulders, neck, and head. In certain embodiments, the apparatus interfaces with the occiput region of the head, providing equal spacing between the left shoulder structure and the head and the right shoulder structure and the head. In doing so, the supporting apparatus minimizes lateral neck flexion to provide the structural rigidity needed to keep the upper neck vertebrae in alignment. In certain embodiments, the shape of an apparatus supports the head and the cervical vertebrae C1-C7. Certain embodiments have protruding features and recessed areas that are intended to support the skull, including the occipital bone, and supporting the shoulder blades of a user. In certain embodiments, protruding features are found on an upper portion and a lower portion of an apparatus.

In certain embodiments, the ergonomic symmetrical shape, such as the location of the protruding features, help to support the occiput of the head and the shoulder of a user. In certain embodiments, an upper portion and a lower portion are symmetrical about a horizontal plane. In certain embodiments, a left side and a right side are symmetrical about a vertical plane. While traditional travel pillows may have a top/bottom orientation for proper function, in certain embodiments, the symmetry found in an apparatus allows a user to more easily use the apparatus, without having to correctly orient the apparatus prior to use.

Certain embodiments of the invention comprise a foam core having a semi-rigid characteristic to support the occipital bone of the skull and the shoulder. Certain embodiments have a C-shaped form, where the vertex or center region of the C-shaped form supports the back of the neck. An opening at the center region of an embodiment of the apparatus provides airflow to the back of the neck. A shell piece attaches to an opening of an embodiment of the apparatus, and a bezel piece further attaches to a shell piece in certain embodiments. In certain embodiments, a shell piece or a shell piece and a bezel give an apparatus torsional rigidity. In certain embodiments, a shell piece, or shell piece and bezel act as a support frame giving an apparatus rigidity. In certain embodiments, structural integrity provided by a frame provides the apparatus rigidity, while a flexible core provides comfort.

Certain embodiments of the invention relate to a supporting apparatus having a size smaller than many devices intended for supporting the neck, head, and shoulders. Certain embodiments have a size that is approximately 80% smaller than traditional travel pillows. A smaller size allows certain embodiments to occupy a smaller volume, allowing greater portability. Certain embodiments have protruding features allowing a smaller size but providing the same or greater support and thus better neck alignment than larger travel pillows.

Certain embodiments are an improvement upon traditional travel pillows. Unlike traditional travel pillows certain embodiments of the invention have a smaller profile, providing the benefit of supporting the head and neck while occupying a smaller volume. Furthermore, certain embodiments of the invention have a C-shaped form that simultaneously supports the back of one's head, such as the occiput, and the base of the neck. In addition, in certain embodiments, the overall form of the apparatus is sold as a single piece unit, requiring less set-up as compared to other multi-piece travel pillows. Furthermore, certain embodiments are sold as a single piece unit, requiring less set up compared to traditional travel pillows that require inflating, molding or shaping, bending, or strapping.

Certain embodiments have a housing comprising a material to maximize a traveler's comfort. Materials that are breathable, moisture wicking, soft, flexible, etc. are used in certain embodiments to increase a traveler's comfort when using certain embodiments of the present invention. In yet another embodiment, the present invention has an opening at a center region to improve air-flow to the neck. Certain embodiments have features that promote the comfort of a user. In certain embodiments, an apparatus can be heated and/or cooled for the comfort of a user. In certain embodiments, an apparatus includes a heating element, for example, a heating coil attached to a battery. In certain embodiments, a heating element, for example, heats a portion of an apparatus, such as a core piece, or a housing, as to provide comfort for a user. In certain embodiments, a heating element or a cooling element are integrated with an apparatus. Certain embodiments of an apparatus incorporate one or more magnets. It will be appreciated that magnets are incorporated in order to increase blood flow, for example, to the head to relieve pressure and reduce tension. Certain embodiments of an apparatus incorporate a vibrating feature. It will be appreciated that vibrating features, such as a vibrating motor, are incorporated in order to provide a massaging effect such as to relieve pressure and reduce tension. It will be appreciated that a battery and switch are used with a heating element, cooling element, or vibrating feature. Certain embodiments use a rechargeable battery.

Certain embodiments of an apparatus are foldable as to become a more compact form. Certain embodiments that are foldable are able to fold along a vertical plane. Folding, in certain embodiments, is accomplished with hinges located on a shell piece. Folding, in certain embodiments, is accomplished with hinges located on a bezel. In certain embodiments, hinges located on a shell piece and a bezel allow folding an apparatus such that the lateral supports are brought together. In certain embodiments of an apparatus that are foldable, a core piece has a recess that allows folding of an apparatus.

DETAILED DESCRIPTION OF CERTAIN EMBODIMENTS

Figure 1:
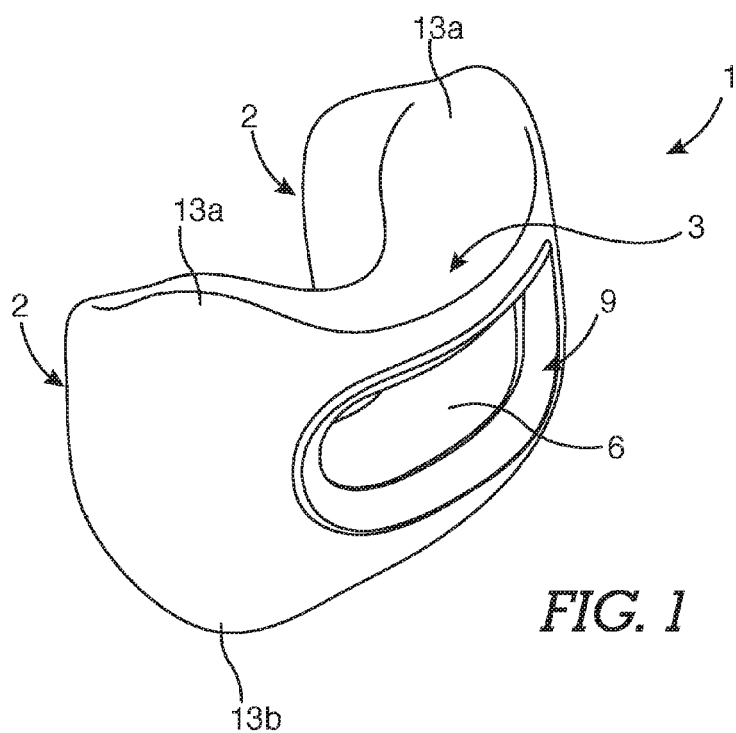
FIG. 1. Perspective view of certain embodiments of the invention.
Figure 2:
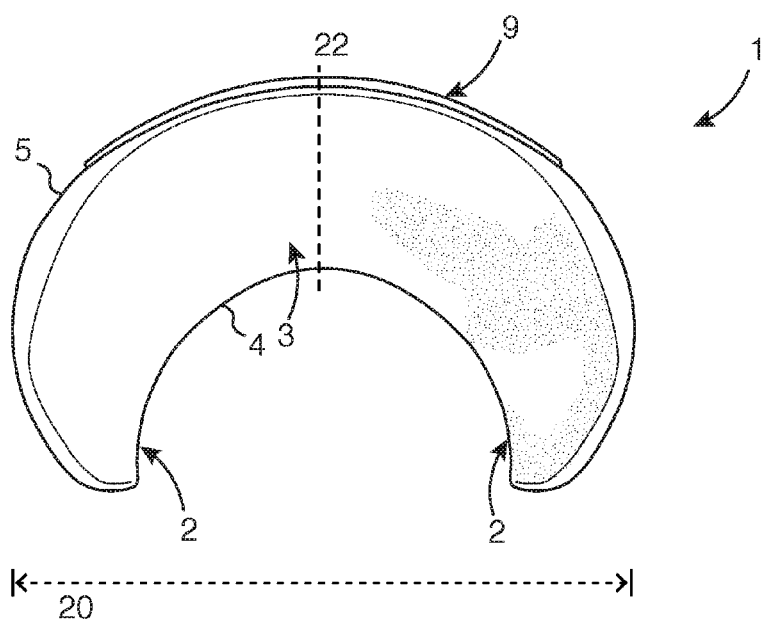
FIG. 2. Top view of certain embodiments of the invention.
Figures 3, 4A:
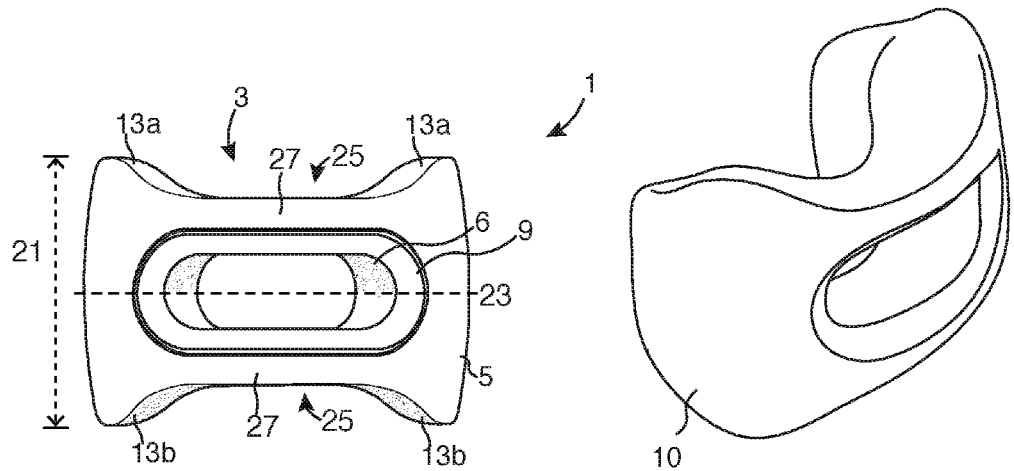
FIG. 3. Front view of certain embodiments of the invention.
FIG. 4A. Perspective view of a housing in certain embodiments.
Figures 5A, 5B, 5C:
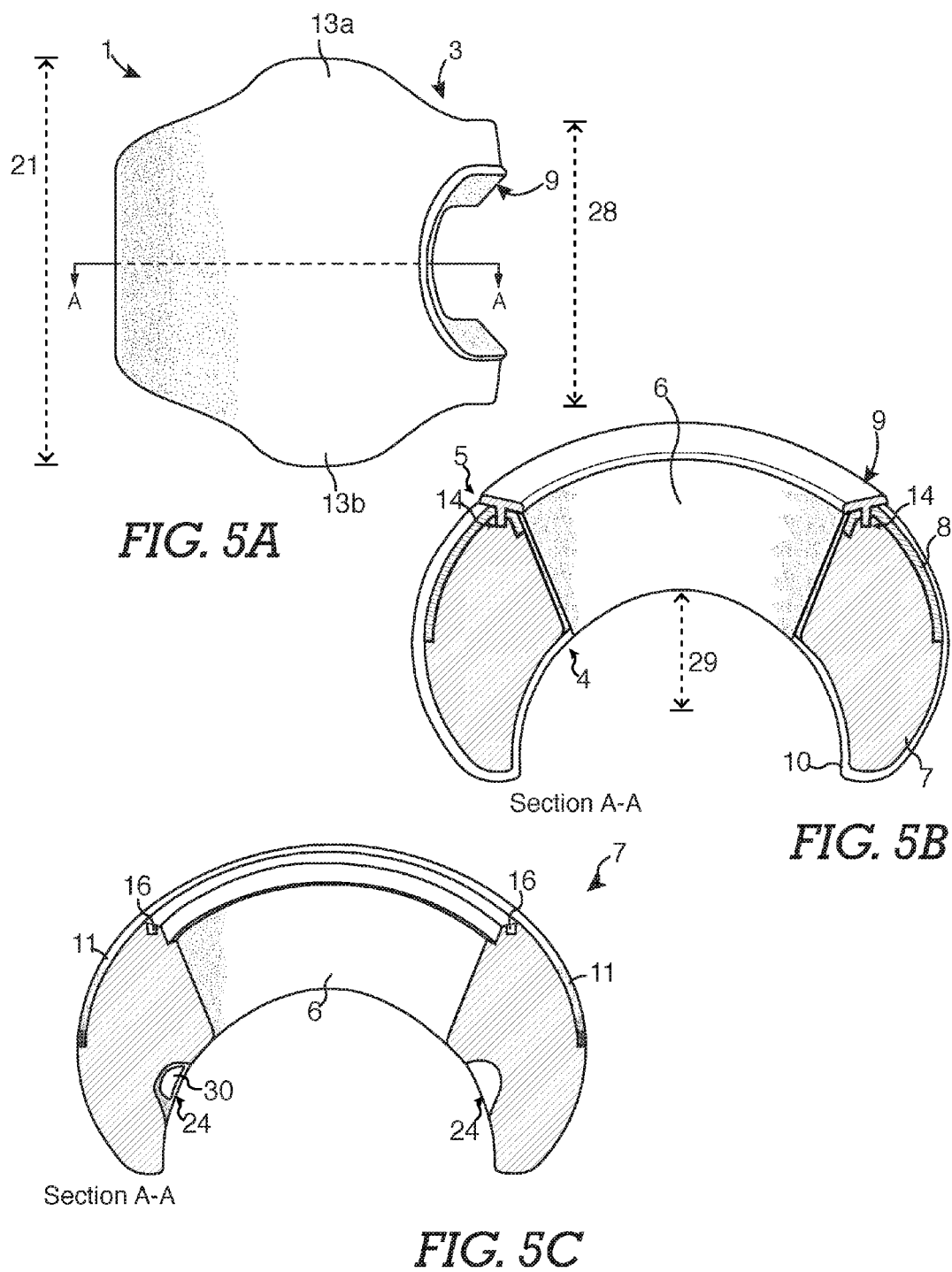
FIG. 5A. Side view of certain embodiments of the invention.
FIG. 5B. Cross-sectional view of certain embodiments of the invention.
FIG. 5C. Cross-sectional view of a core piece in certain embodiments.

In certain embodiments, the supporting apparatus 1 is C-shaped, having a vertex or center region 3 and two end regions or lateral supports 2, as seen in FIG. 1 showing a perspective view, and FIG. 2 showing a top view. A center region 3 supports a user's nape, and two lateral supports 2 support a portion of a user's neck. An interiorly located inner wall 4 has a curved form fitting a user's neck. An exteriorly located outer wall 5 has a curved form. Referring to FIG. 1, and FIG. 3, certain embodiments of the invention comprise an opening 6. Referring to FIG. 5B showing a cross-sectional view of certain embodiments, such opening 6 spans from the outer wall 5 of a center region to the inner wall 4 of a center region. It will be appreciated that this opening or channel allows venting of air to facilitate airflow. An opening 6, also shown, for example, in FIG. 8A and FIG. 8B, allows adequate airflow to the user's neck to provide comfort to a user. Referring to FIG. 2, and FIG. 3, a bezel 9 is mounted to an outer wall 5 of the center region 3.

As seen in a front view in FIG. 3, certain embodiments have a center region 3 having an opening 6 disposed between supports 27. A support 27 disposed between protruding features 13a or between protruding features 13b forms a recess 25. Such recesses 25 accommodate, for example, a user's occiput and the neck. In certain embodiments, a rim of the opening 6 is supported by a shell piece, and in certain embodiments further supported by a bezel 9. It will be appreciated that the supports 27, shell piece, and bezel form a supportive structure introducing semi-rigid and flexible characteristics to the apparatus. In certain embodiments, the supports 27, shell piece, and bezel center region 3 allow an apparatus to have a spring-like action, which provide support for the head, neck, and shoulders, while providing comfort for the user.

Figure 4B:
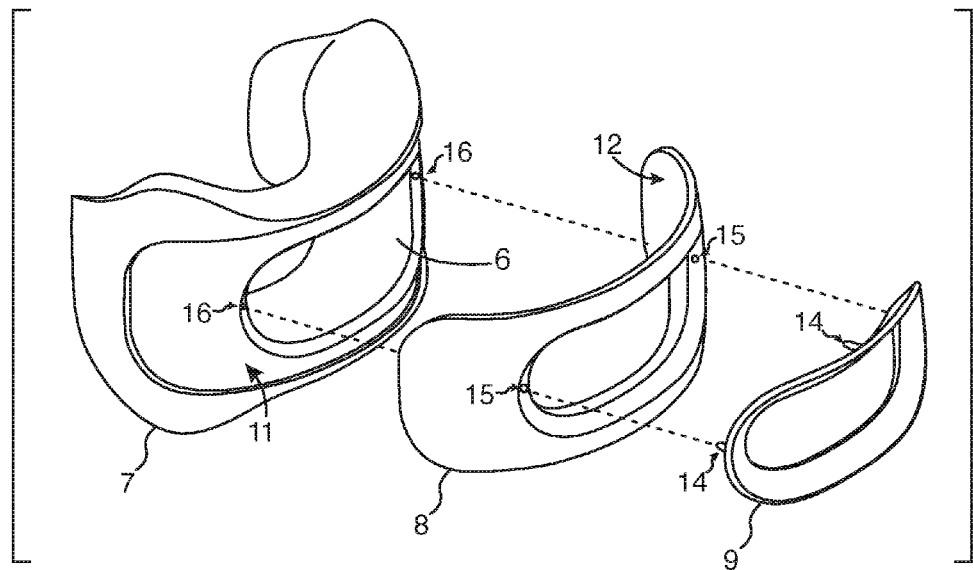
FIG. 4B. Exploded view of an assembly in certain embodiments of the invention.

Certain embodiments of the invention comprise a core piece 7, a shell piece 8, and a bezel 9, as shown, for example, in FIG. 4B. The core piece 7 can be injection molded in certain embodiments. In certain embodiments, core piece 7 comprises foam, such as a #1 polyurethane foam. In certain embodiments, core piece 7 comprises a memory foam such as a low resilience polyurethane foam. Preferably, certain embodiments comprise a dual foam core with a #1 polyurethane foam and a low resilience polyurethane foam. It will be appreciated that by using a material such as memory foam, or #1 polyurethane, or a blend of such materials allows an apparatus 1 to provide support while allowing some deformation of the core piece providing increased comfort for the user. The material for the core piece 7 may also include, but is not limited to the following: high density memory foam, medium-density memory foam, low-density memory foam, high-resilience foam, latex, latex blends.

Still referring to FIG. 4B, the surface 12 of a shell piece 8 is attached to a surface 11 of a core piece 7. Such attachment may be accomplished, for example, with an adhesive. In certain embodiments, a surface 11 of a core piece 7 is recessed to accommodate a shell piece 8, as for example, shown in FIG. 5C. An assembly comprising a core piece 7 and a shell piece 8 are assembled (FIG. 5B), and a housing 10 (FIGS. 4A and 5B), is placed over such assembly. It will be appreciated that a housing 10 can be wrapped and sewn around the assembly. A housing 10 is made of a materials including, but not limited to fabrics natural and/or synthetic (e.g. cotton, cotton blends, canvas, polyester, polyester blends, nylon), fabrics woven and non-woven, technical fabrics, or animal skin such as leather, among others. In certain embodiments, a housing 10 comprises a ballistic nylon. In certain embodiments, a housing 10 comprises a moisture wicking fabric, such as a microfiber, polyester fabric (e.g. Nike Dri-Fit®). In certain embodiments, a housing 10 comprises a dual fabric with a ballistic nylon and a moisture wicking fabric combination. A housing made of a material having characteristics of breathability, moisture wicking, soft, flexible, etc., allows for increased user comfort. A housing is easily cleaned, and have characteristics of being hand-washable or machine-washable.

Still referring to FIG. 4B, a bezel 9 is attached to an assembly comprising a shell piece 8, and a core piece 7. In certain embodiments, a bezel 9 is a flexible or semi-rigid material. In certain embodiments, a bezel 9 is an injection molded plastic, but is not limited to such material. In certain embodiments, a bezel 9 located on a rim of an opening 6, and/or a shell piece 8 provides structural support for the apparatus 1. In certain embodiments, a core piece 7, a shell piece 8, and a bezel 9 are fastened by inserting a peg 14 (FIG. 4B and FIG. 5B) found on a bezel, through a hole 15 found on a shell piece 8, and through a hole 16 located on a core piece 7 (FIG. 4B and FIG. 5C), as shown for example in FIG. 4B. It will be appreciated that a bezel and a shell piece can be fastened in any number of ways, including, but not limited to with an adhesive, fasteners such as screws, clamps, and plastic welding.

It will be appreciated that certain embodiments of the invention are designed to have a small size while still maintaining the ability to support the head and neck. Referring to FIG. 2, in certain embodiments, the width 20 of an apparatus 1 is approximately 7 inches (approximately 18 cm). Referring to FIG. 3 and FIG. 5A, in certain embodiments, the height 21 of an apparatus 1 measures the maximum height of the lateral supports including protruding features 13a and 13b. In certain embodiments, a height 21 is approximately 5 inches (approximately 13 cm). Further referring to FIG. 5A, a length 28 of a center region is approximately 3.5 inches (approximately 9 cm). Generally, a center region 3 has length 28 that is shorter than the height 21 of a lateral support. Referring to FIG. 5B, in certain embodiments, an apparatus has an inner wall 4 surface defined by an arc having a radius 29 of approximately 1.75 inches (approximately 4.5 cm). It will be appreciated that specific measurements as described in certain embodiments are meant to be exemplary and not limiting. By having such dimensions or similar dimensions in certain embodiments, an apparatus 1 can cradle the back of the neck without wrapping around the neck. Further, such dimensions or similar dimensions provide portability during travel.

Figure 6:
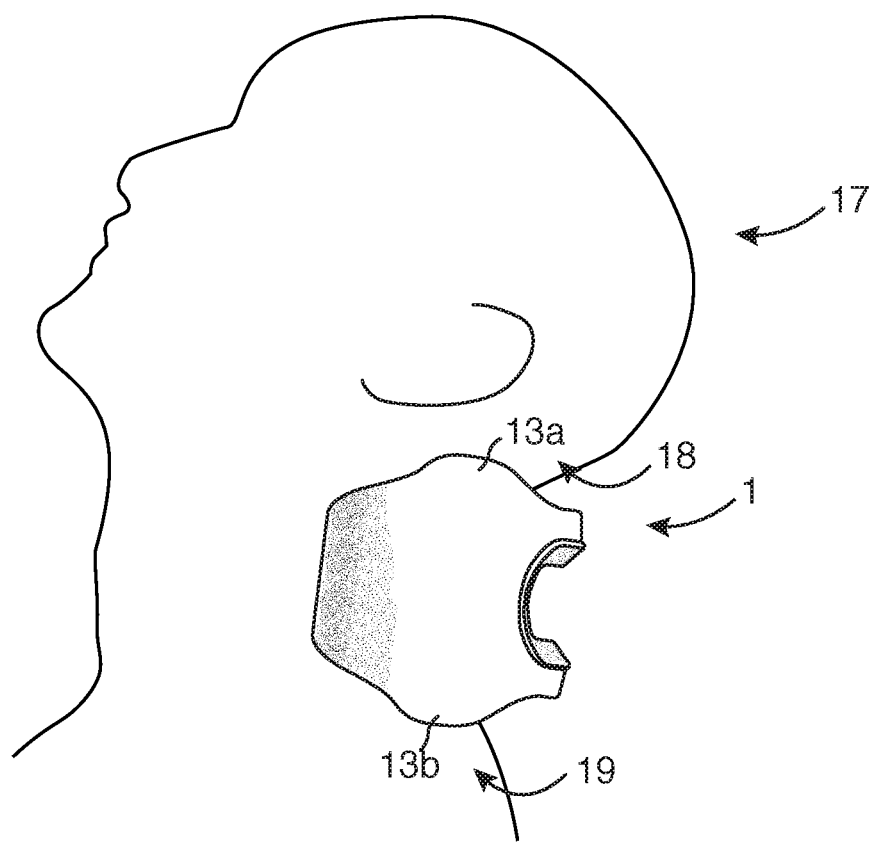
FIG. 6. A user using certain embodiments of the invention.
Figure 7A:
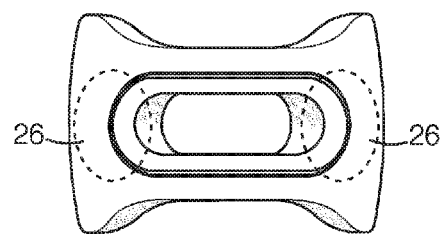
FIG. 7A. Front view of certain embodiments showing the location of features that promote comfort.
Figure 7B:
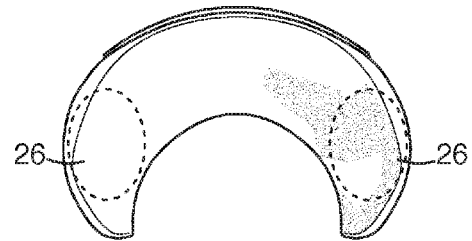
FIG. 7B. Top view of certain embodiments showing the location of features that promote comfort.
Figure 7C:
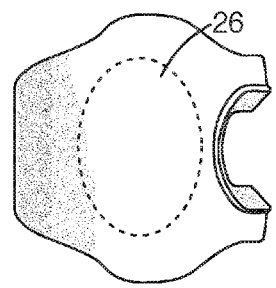
FIG. 7C. Side view of certain embodiments showing the location of features that promote comfort.
Figure 7D:
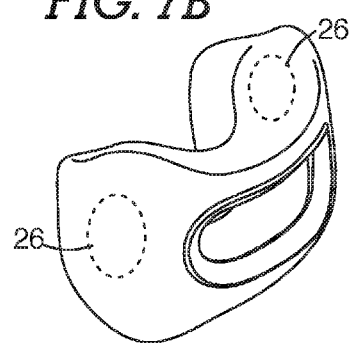
FIG. 7D. Perspective view of certain embodiments showing the location of features that promote comfort.

As shown in FIG. 6, a user 17 places an embodiment of an apparatus 1 on the posterior region of the neck. Apparatus 1 supports the occipital bone of a user's head 18 and the trapezius muscle of a user's shoulder 19.

Figure 8A:
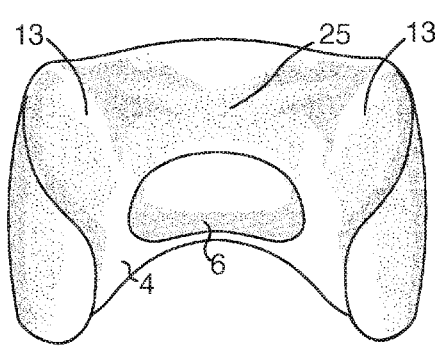
FIG. 8A. Rear perspective view of certain embodiments of the invention.
Figure 8B:
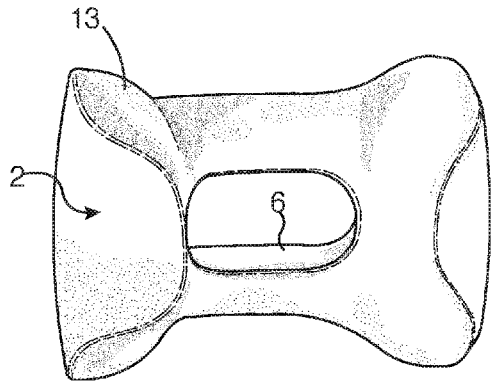
FIG. 8B. Rear perspective view of certain embodiments of the invention.

Referring to FIG. 5A, and shown for example in FIG. 1, FIG. 3, and FIG. 6, certain embodiments have protruding features 13a located on an upper portion, and protruding features 13b located on a lower portion of an apparatus 1. In general, protruding features project laterally from a horizontal plane 23, as shown in FIG. 3. Protruding features 13a and 13b assist in distributing the load-bearing regions of apparatus 1. In certain embodiments, protruding features 13a engages with temporal region of the head. In certain embodiments, a recess created between such protruding features engages with an occiput. It can be appreciated that placement of protruding features 13b on an apparatus 1 allows the weight of a user's head on an apparatus 1 to be distributed to the trapezius muscles, alleviating some of the weight supported by the neck muscles. Such features are advantageous over traditional travel pillows of larger sizes. It will also be appreciated that such protruding features 13a and 13b allow apparatus 1 to be designed to be a generally smaller size. In certain embodiments, protruding features 13a and 13b prevent lateral movement of the head. Referring to FIG. 8A, an apparatus has a recess 25 flanked between two protruding features 13, where the recess and protruding features support the back of the head and upper portion of the neck, or the base of the neck and the shoulders. Still referring to FIG. 8A, in certain embodiments, an inner wall 4 supports the back and side portions of a neck. In certain embodiments, such inner wall 4 is curved to comfortably fit a user's neck. Referring to FIG. 8B, a protruding feature 13 is located proximal to a lateral support 2 and has a curved form projecting inward and upward (or downward). In certain embodiments, an upper portion and a lower portion are symmetrical about a horizontal plane 23, as shown for example in FIG. 3. In certain embodiments, two lateral supports 2 are symmetrical about a vertical plane 22 as shown for example in FIG. 2. It can further be appreciated that in certain embodiments an apparatus 1 of a single configuration can be used for both men and women. In certain other embodiments, other configurations designed for men, women, and children can be used.

Certain embodiments can be attached to other items, including but not limited to bags, purses, luggage, strollers, and devices. In certain embodiments, a fastening device is attached to a portion of an apparatus 1. In certain embodiments, a fastening device, such as, but not limited to a clasp, key-ring, hook, carabiner, and lobster clasp is attached to an apparatus 1. In certain embodiments, a fastening device is placed through an opening 6.

Certain embodiments of an apparatus have a speaker. In certain embodiments, a speaker includes, but is not limited to portable speakers and headphones, further connected to an electronic device capable of outputting sound (for example, mp3 players, internet-connected device, etc.). In certain embodiments, a speaker is located within an apparatus. In certain embodiments, a speaker is located on an exterior of an apparatus, for example, on a flap integrated with a housing. Users intending to listen to a speaker may lift a flap to position a speaker over their ears. In certain embodiments, headphones are stored within a compartment of an apparatus, for example in region 26, seen in FIGS. 7A-D.

In certain embodiments, features that promote comfort to a user are found on certain regions of an apparatus. For example, as shown in FIG. 7A, FIG. 7B, FIG. 7C, and FIG. 7D, features, including, but not limited to a heating element, cooling element, magnets, and vibrating feature are found in or around a region 26. In certain embodiments, such features may be found in an area outside of a region 26. For example, in certain embodiments, such features are placed in or on a core piece, and in certain embodiments, such features are placed in or on a bezel piece, shell piece, or housing. Referring to FIG. 5C, in certain embodiments, such feature 30, for example, a heating element, cooling element, magnets, and vibrating feature, is placed in a cavity 24. It will be appreciated that a cavity 24 is found on a number of different locations in or on an apparatus, for example, an inner wall of a core piece 7, but may also be placed on an outer wall, a top, or bottom surface of a core piece, on or around a protruding feature, or may be embedded within a core piece. It will be appreciated by those skilled in the art that a cavity can be used to carry, for example, wires, switches, and batteries, that allow features, for example, a heating element, cooling element, magnets, and vibrating feature, to function.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The descriptive labels associated with the numerical references in the figures are intended to merely illustrate embodiments of the invention, and are in no way intended to limit the invention to the scope of the descriptive labels. The present systems, methods, means, and enablement are not limited to the particular systems, and methodologies described, as there can be multiple possible embodiments, which are not expressly illustrated in the present disclosures. It is also to be understood that the terminology used in the description is for the purpose of describing the particular versions or embodiments only, and is not intended to limit the scope of the present application.

Some embodiments, illustrating its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any methods, and systems similar or equivalent to those described herein can be used in the practice or testing of embodiments, the preferred methods, and systems are now described. The disclosed embodiments are merely exemplary.

What is claimed is:

1. A headrest comprising:
a core, said core further comprising:
a c-shaped form;
an inner surface having a shape configured to support the back of a user's neck;
an outer surface;
a center region;
two end regions extending laterally and curving symmetrically from said center region;
an opening through said center region, said opening extending from said inner surface to said outer surface,
an upper support structure and a lower support structure located above and below said opening;
at least one protrusion flanking said upper support structure, said protrusion extending upward and towards the middle of said c-shaped form;
at least one protrusion flanking said lower support structure, said protrusion extending downward and towards the middle of said c-shaped form;
said user's head resting on said upper support structure and between said protrusions;
a base of said user's neck resting on said lower support structure and between said protrusions; and
a material encased by said inner surface and said outer surface;
a shell piece curved substantially similar to said outer surface of said core and attached to said outer surface of said core;
said shell piece further comprising and opening;
wherein said shell piece provides torsional rigidity;
a housing covering said core and said shell piece; and
a bezel having an opening and attached to said shell piece.

2. The headrest of claim 1, wherein the material of said core comprises a polyurethane foam.

3. The headrest of claim 1, wherein the material of said core comprises a foam mixture.

4. The headrest of claim 1, wherein said shell piece comprises a material that provides structural rigidity.

5. The headrest of claim 4, wherein said shell piece comprises an injection molded plastic.

6. The headrest of claim 1, wherein said bezel comprises an injection molded plastic.

7. The headrest of claim 1, wherein said headrest supports the user's occiput.

8. The headrest of claim 1, wherein the shape is symmetrical about a vertical plane.

9. The headrest of claim 1, wherein the shape is symmetrical about a horizontal plane.

10. The headrest of claim 1, further comprising a vibrating feature.

11. The headrest of claim 1, further comprising a heating feature.

12. The headrest of claim 1, further comprising a cooling feature.

13. The headrest of claim 1, further comprising a magnetic feature.

14. A headrest comprising:
a C-shaped form, said C-shaped form further comprising:
a center region substantially aligning with a user's spine;
two end regions partially curving around said user's neck;
a curved inner surface configured to said user's nape;
protrusions located on said inner surface, said protrusions projecting inward and projecting laterally from a horizontal plane;

a recess located between said protrusions, said recess configured to support the back of the user's head and the base of the user's neck;
an outer surface having a curved form;
a single channel connecting said inner surface and said outer surface and located in said center region;
a curved plate attaching to the outer surface of said c-shaped form, said curved plate further comprising:
a through-hole, said through-hole having a rim matching the shape and position of said channel of said c-shaped form creating a continuous opening;
an inner surface, said inner surface of said curved plate affixing to said outer surface of said c-shaped form creating torsional rigidity;
a housing encapsulating said C-shaped form and said curved plate; and
a bezel attaching to said rim of said curved plate.

15. The headrest of claim 14, wherein said C-shaped form comprises a polyurethane foam.

16. The headrest of claim 14, wherein said curved plate comprises a foam mixture material.

17. The headrest of claim 14, wherein said curved plate comprises an injection molded plastic.

18. The headrest of claim 14 wherein said housing is a material selected from the group of a nylon type fabric, a canvas type fabric, cotton, and a hand-washable fabric.

* * * * *